United States Patent
Bae et al.

(10) Patent No.: US 9,207,459 B2
(45) Date of Patent: *Dec. 8, 2015

(54) 2D/3D SWITCHABLE IMAGE DISPLAY DEVICE

(71) Applicant: Samsung Electronics Co., Ltd., Suwon-si (KR)

(72) Inventors: Jung-mok Bae, Seoul (KR); Yun-woo Nam, Seoul (KR); Yong-Kweun Mun, Yongin-si (KR); Hoon Song, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/505,194

(22) Filed: Oct. 2, 2014

(65) Prior Publication Data

US 2015/0015816 A1    Jan. 15, 2015

Related U.S. Application Data

(63) Continuation of application No. 12/983,674, filed on Jan. 3, 2011, now Pat. No. 8,873,004.

(30) Foreign Application Priority Data

Feb. 4, 2010    (KR) .......................... 10-2010-0010614

(51) Int. Cl.
| | | |
|---|---|---|
| *G02F 1/1335* | (2006.01) | |
| *G02B 27/22* | (2006.01) | |
| *G02B 26/08* | (2006.01) | |
| *G02B 5/04* | (2006.01) | |
| *G02B 26/00* | (2006.01) | |
| *G02B 27/00* | (2006.01) | |
| *G02F 1/29* | (2006.01) | |

(52) U.S. Cl.
CPC ............ *G02B 27/2214* (2013.01); *G02B 5/045* (2013.01); *G02B 26/005* (2013.01); *G02B 26/08* (2013.01); *G02B 27/0093* (2013.01); *G02B 27/22* (2013.01); *G02F 1/29* (2013.01)

(58) Field of Classification Search
None
See application file for complete search history.

(56) References Cited

U.S. PATENT DOCUMENTS

| 7,515,340 B1 | 4/2009 | Shiu et al. | |
| 8,873,004 B2 * | 10/2014 | Bae et al. | 349/112 |

(Continued)

FOREIGN PATENT DOCUMENTS

| GB | 2482226 A | 1/2012 |
| JP | 2000-356750 A | 12/2000 |

(Continued)

OTHER PUBLICATIONS

Hayes et al., "Video-speed electronic paper based on electrowetting", Nature, vol. 425, Sep. 25, 2003, pp. 383-385.*

(Continued)

*Primary Examiner* — Michelle R Connelly
(74) *Attorney, Agent, or Firm* — NSIP Law (57) ABSTRACT

A two-dimensional (2D)/three-dimensional (3D) switchable image display device is provided. The 2D/3D switchable image display device forms gradation of an image in a light modulation panel, provides color to light beams that penetrate a plurality of electro-wetting prisms arranged in correspondence to the plurality of pixels of the image, and adjusts the direction of the light beam such that the light beams of the pixels of the image are directed towards at least two different view zones in a 3D mode and such that the light beams maintain their paths in a 2D mode.

17 Claims, 7 Drawing Sheets

(56) References Cited

U.S. PATENT DOCUMENTS

| | | |
|---|---|---|
| 2008/0100922 A1* | 5/2008 | Choi et al. .................... 359/665 |
| 2010/0060974 A1* | 3/2010 | Wang et al. .................. 359/296 |
| 2012/0154886 A1 | 6/2012 | Heikenfeld et al. |
| 2012/0320113 A1* | 12/2012 | Hagood et al. ................ 345/690 |

FOREIGN PATENT DOCUMENTS

| | | |
|---|---|---|
| JP | 2001-228307 A | 8/2001 |
| JP | 2008-298821 A | 12/2008 |
| JP | 2009-031795 A | 2/2009 |
| KR | 10-2007-0092288 A | 9/2007 |
| WO | WO 2007/072289 A2 | 6/2007 |
| WO | WO 2007072289 A2 * | 6/2007 |

OTHER PUBLICATIONS

Hayes, Robert A., et al. "Video-speed electronic paper based on electrowetting." Nature 425.6956 (2003): 383-385.

* cited by examiner

2D/3D SWITCHABLE IMAGE DISPLAY DEVICE

CROSS-REFERENCE TO RELATED APPLICATIONS

This application is a Continuation Application of U.S. patent application Ser. No. 12/983,674, filed Jan. 3, 2011, which claims the benefit of Korean Patent Application No. 10-2010-0010614, filed on Feb. 4, 2010, in the Korean Intellectual Property Office, the entire disclosures of which is incorporated herein by reference for all purposes.

BACKGROUND

1. Field

The following description relates to a stereoscopic image display device, and more particularly, to a two-dimensional/three-dimensional (2D/3D) switchable image display device.

2. Description of the Related Art

Recently, as the flat panel display market has become saturated, the flat panel display industry is seeking new markets. Thus, stereoscopic image display devices have attracted attention as a next-generation application for the flat panel display industry. For example, movie theaters and flat panel display-based TVs, generally use image display devices in combination with 3D eyeglasses. However, the use of eyeglasses can be irritating while at the same time not providing a high quality 3D image. Thus, image display devices that improve 3D image quality and that do not use eyeglasses are under consideration and development.

In the image display devices not using glasses, to be compatible with the existing panel and contents it is necessary that the image display device be able to switch between two-dimensional (2D) and three-dimensional (3D) images.

SUMMARY

In one general aspect, there is provided a two-dimensional/three-dimensional (2D/3D) switchable image display device comprising a backlight unit for emitting light, a light modulation panel for modulating the light emitted from the backlight unit based on image information and for forming image gradation, an electro-wetting prism array comprising a plurality of electro-wetting prisms that are arranged in correspondence to a plurality of pixels of the image, for providing color to light beams that penetrate the plurality of electro-wetting prisms, and for adjusting the direction of the light beams, and a control unit for controlling the electro-wetting prism array such that the light beams of the plurality of pixels of the image are directed towards at least two different view zones in a 3D mode, and such that the light beams of the plurality of pixels of the image maintain the paths of the light beams in a 2D mode.

The electro-wetting prism may comprise a first medium having color, a transparent second medium separate from the first medium, a housing for housing the first medium and the second medium, and comprising a light incidence plane, a light output plane facing the light incidence plane, and a plurality of side walls formed between the light incidence plane and the light output plane, and an electrode structure for adjusting an angle of an interface between the first medium and the second medium.

The control unit may control the electro-wetting prism array such that the interface between the first medium and the second medium is inclined to the light incidence plane in a 3D mode, and such that the interface between the first medium and the second medium is approximately parallel to the light incidence plane in a 2D mode.

The electrode structure may comprise first and second electrodes that are formed in first and second side walls, respectively, and which face each other, and first and second insulating layers that cover the first and second electrodes, respectively, and which each have a hydrophobic surface.

The first medium may be an oily solution containing colored dyes and the second medium may be an aqueous solution.

The first medium may be an aqueous solution containing colored pigments and the second medium may be an oily solution.

The electro-wetting prism array may comprise a red electro-wetting prism that has a red first medium, a green electro-wetting prism that has a green first medium, and a blue electro-wetting prism that has a blue first medium.

The electro-wetting prism array may further comprise a barrier wall formed between each of the plurality of electro-wetting prisms.

The barrier wall may be formed of a black material for blocking light.

The 2D/3D switchable image display device may further comprise a variable diffuser unit that is switchable between a scattering mode for scattering passing light and a transparent mode for transmitting passing light without scattering, wherein the control unit controls the variable diffuser unit to be in a transparent mode during a 3D mode and to be in a scattering mode during a 2D mode.

The variable diffuser unit may be a polymer dispersed liquid crystal (PDLC) panel.

The light modulation panel may be a liquid crystal panel.

The backlight unit may be a collimating surface light source emitting collimated light in a first direction.

In another aspect, there is provided an electro-wetting prism array comprising a plurality of electro-wetting prisms arranged in a two-dimensional (2D) array and including a plurality of red, green, and blue electro-wetting prisms that receive image information and, for providing color to the image information that penetrates the plurality of electro-wetting prisms, and a barrier wall located between each electro-wetting prism, wherein the electro wetting prism array is capable of switching between a 2D mode in which image information passes through the electro-wetting prism array such that when viewed by a user both a left and a right eye of a user see the same image, and a 3D mode in which image information is directed by the electro-wetting prism array to at least two different view zones such that when viewed by the user the left eye sees a first image and the right eye sees a second image that has a different parallax than the first image.

Image information may be directed by the electro-wetting prism array in at least two different view zones such that when viewed by the user the left eye and the right eye of the user experience a binocular disparity.

Image information may be directed by the electro-wetting prism array in at least two different view zones such that when viewed by the user the left eye and the right eye of the user experience a stereoscopic effect.

In 3D mode the first image and the second image may be displayed at the same time.

In 3D mode the first image and the second image may be displayed sequentially.

The electro-wetting prism array may be electrically connected to a sensor to sense a user's position and gather data that is used by the electro-wetting prism array to optimize a view zone of the user based on the user's sensed position.

The barrier wall may function as a black matrix that reduces the generation of a black band effect and also prevents crosstalk between the image information received by each of the plurality of electro-wetting prisms.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
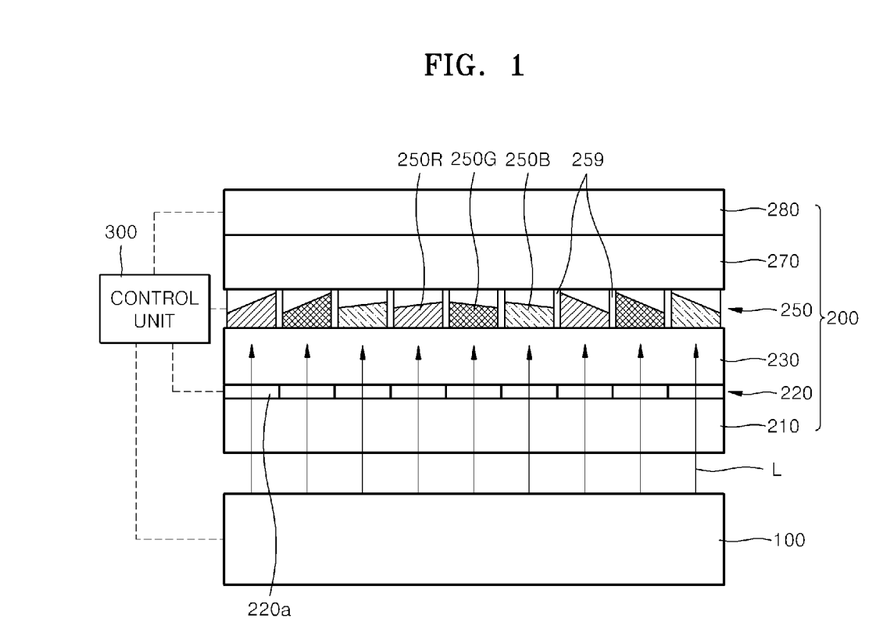
FIG. 1 is a diagram illustrating an example of a two-dimensional/three-dimensional (2D/3D) switchable image display device.

FIG. 1 illustrates an example of a two-dimensional (2D)/three-dimensional (3D) switchable image display device. For example, the image display device may be or may be included in a camera, a computer such as a laptop or personal computer, a television, a mobile terminal, and the like.

Referring to FIG. 1, the 2D/3D switchable image display device includes a backlight unit 100, a display panel 200, and a control unit 300 controlling the backlight unit 100 and the display panel 200.

The backlight unit 100 is located at a rear side of the display panel 200 and emits light towards the display panel 200. The backlight unit 100 may be a well-known surface light source, for example, a liquid crystal display (LCD), one or more light-emitting diodes (LEDs), one or more organic light-emitting diodes (OLEDs), and the like. For example, the backlight unit 100 may include a light guide panel and a light source formed at a side of the light guide panel. The light source may be a surface light source in which a point light source is arranged in a 2D array. The backlight unit 100 may include a pattern for improving the directivity of light L and the pattern may be located adjacent to the light output plane side. The backlight unit 100 may include an optical film such as a prism sheet such that the backlight unit 100 may emit collimated light in a direction that is approximately perpendicular to the light output plane.

The display panel 200 may include, for example, a first substrate 210, a liquid crystal layer 220, a second substrate 230, an electro-wetting prism array 250, and a third substrate 270.

The first through third substrates 210, 230, and 270 support the liquid crystal layer 220 and the electro-wetting prism array 250, and may be formed of a transparent material, for example, glass, plastic, and the like. An electric circuit (not shown) may be formed in the first through third substrates 210, 230, and 270 and may be used to drive the liquid crystal layer 220 and the electro-wetting prism array 250.

The liquid crystal layer 220 may include a plurality of liquid crystal cells 220a arranged in a 2D array. The image gradation may be formed by modulating the light L emitted from the backlight unit 100 based on the image information. A transparent pixel electrode (not shown) and a pixel circuit (not shown) may be formed on an upper surface of the first substrate 210 and may be used to apply a voltage to the liquid crystal layer 220. A transparent common electrode (not shown) may be formed on a lower surface of the second substrate 230.

The electro-wetting prism array 250 provides color to light beams that pass through the liquid crystal cells 220a of the liquid crystal layer 220 and controls the direction of the light beams. The electro-wetting prism array 250 includes a plurality of red, green, and blue electro-wetting prisms 250R, 250G, and 250B.

Figure 2:
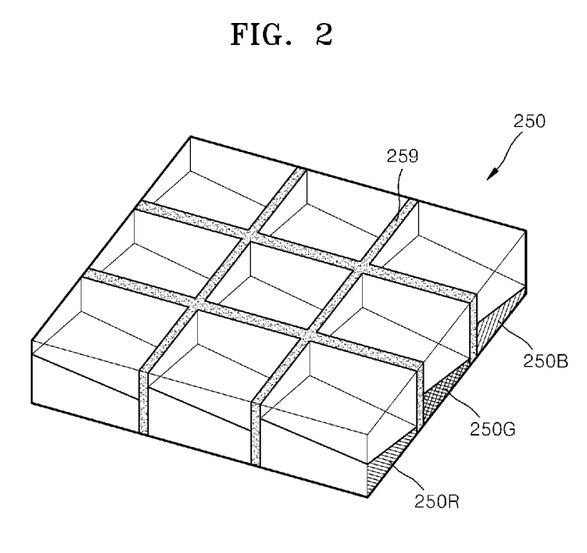
FIG. 2 is a diagram illustrating an example of an electro-wetting prism array that may be included in a 2D/3D switchable image display device.

FIG. 2 illustrates an example of an electro-wetting prism array that may be included in a 2D/3D switchable image display device. Referring to FIGS. 1 & 2, the electro-wetting prism array 250 includes the plurality of red, green, and blue electro-wetting prisms 250R, 250G, and 250B that are arranged in a 2D array. A barrier wall 259 may be formed between the plurality of red, green, and blue electro-wetting prisms 250R, 250G, and 250B.

The electro-wetting prisms 250R, 250G and 250B may control the direction of a light beam L. Also, the electro-wetting prisms 250R, 250G, and 250B may function as a color filter. Accordingly, an additional color filter does not need to be formed on the display panel 200. Because a color filter is not used, the process of arranging upper and lower plates, which is required in the manufacturing of a conventional display panel, is omitted. Thus, the process of manufacturing an image display device can be simplified, thereby increasing production yield and reducing the manufacturing cost.

The barrier wall 259 may be formed of a black material in order to block light, and may function as a black matrix for preventing light passing through the adjacent red, green, and blue electro-wetting prisms 250R, 250G, and 250B from being overlapped, thereby preventing crosstalk. In a conventional stereoscopic image display device using a perpendicular lenticular lens array, a black matrix formed on a display panel is enlarged by a lenticular lens, which results in generation of a black band at certain viewing angles. Because the barrier wall 259 of the electro-wetting prism array 250 functions as a black matrix, a black band is not generated by the 2D/3D switchable image display device described herein.

Figure 3:
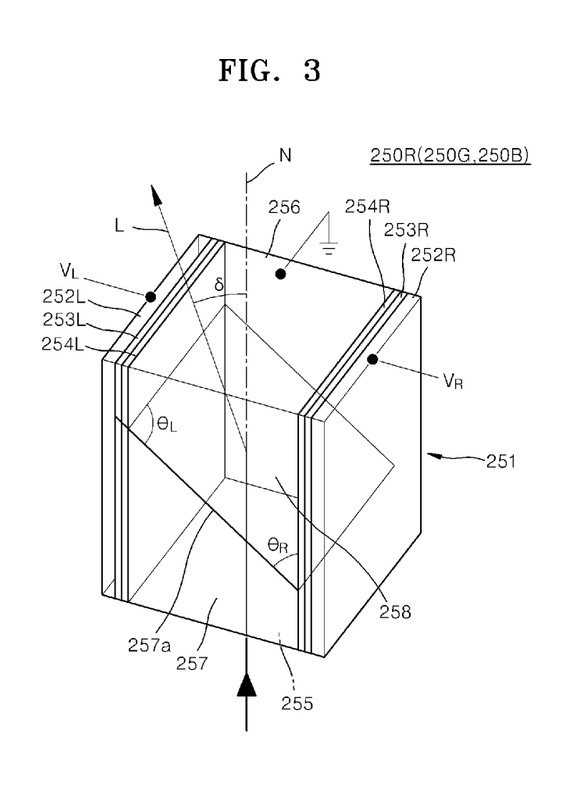
FIG. 3 is a diagram illustrating an example of an electro-wetting prism of the electro-wetting prism array of FIG. 2.

FIG. 3 illustrates an example of an electro-wetting prism of the electro-wetting prism array 250, for example, electro-wetting prisms 250R, 250G, and 250B. Referring to the example shown in FIG. 3, each of the electro-wetting prisms 250R, 250G and 250B includes a housing 251 and first and second mediums 257 and 258 in the housing 251.

The housing 251 may include a light incidence plane 255, a light output plane 256 facing the light incidence plane 255, a plurality of side walls formed between the light incidence plane 255 and the light output plane 256. For example, as illustrated in FIG. 3, the housing 251 may have a rectangular shape, a square shape, and the like. In this example, a first electrode 252L to which a first voltage $V_L$ is applied and a second electrode 252R to which a second voltage $V_R$ is applied, may be formed in two side walls facing each other, from among the four side walls of the housing 251. The first electrode 252L and the second electrode 252R may be insulated by a first insulating layer 253L and a second insulating layer 253R, respectively. The first electrode 252L and the second electrode 252R may be coated with a first hydrophobic film 254L and a second hydrophobic film 254R, respectively.

In the alternative, instead of coating the first hydrophobic film 254L and the second hydrophobic film 254R, the first insulating layer 253L and the second insulating layer 253R may be formed of a hydrophobic material. A transparent electrode (not shown) may be formed in the light output plane 256 and may be used to apply a voltage to the second medium 258. The transparent electrode may be grounded. In this example, the 2D/3D switchable image display device is driven by two electrodes, however, this is merely for purposes of example. It should be understood that additional electrodes may be formed in the side walls of the housing 251 such that the 2D/3D switchable image display device is driven by additional electrodes.

The first medium 257 and the second medium 258 may have different refractive indexes and electrical conductivities. For example, the first medium 257 may be an oily-type solution that contains colored dyes, and the second medium 258 may be a transparent aqueous solution that is not mixed with the first medium 257. Alternatively, the first medium 257 may be a transparent oily solution and the second medium 258 may be an aqueous solution containing color pigments.

Referring again to FIG. 1, the display panel 200 may include a variable diffuser unit 280 capable of improving a wide viewing angle property of the image display device in a 2D mode. For example, the variable diffuser unit 280 may be a well-known polymer dispersed liquid crystal (PDLC) panel. The PDLC panel has a structure that includes a PDLC layer formed by mixing a polymer dispersed-type liquid crystal and a black dye and is interposed between transparent substrates.

When an electric field is not applied, the PDLC panel may be in a scattering mode in which incident light is scattered due to a dielectric constant difference between the polymer and the liquid crystal. In the alternative, when an electric field is applied, a dielectric constant difference between polymer and liquid crystal aligned according to the electric field is reduced, and the PDLC panel becomes transparent. Accordingly, the PDLC may be in a transparent mode that transmits light. The variable diffuser unit 280 may be controlled by the control unit 300 such that the variable diffuser unit 280 is in a transparent mode when displaying a 3D image and is in a scattering mode when displaying a 2D image.

Operations of the electro-wetting prisms 250R, 250G and 250B and the 2D/3D switchable image display device are described with reference to FIGS. 4 and 5.

Figure 4:
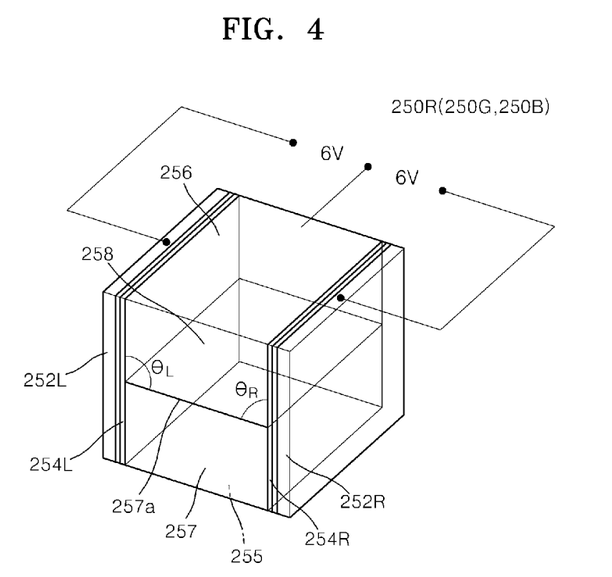
FIG. 4 is a diagram illustrating an example of an electro-wetting prism in a first state.

FIG. 4 illustrates an example of an electro-wetting prism in a first state. When a voltage is applied to the first electrode 252L and the second electrode 252R using electro-wetting, the second medium 258, which is an aqueous solution, is wet to the first hydrophobic film 254L and the second hydrophobic film 254R. At this time, a first contact angle $\theta_L$ and a second contact angle $\theta_R$ may vary based on the magnitude of the applied voltage.

When the electro-wetting prisms 250R, 250G and 250B are in the first state, an interface 257a between the first medium 257 and the second medium 258 is approximately parallel to the light incidence plane 255. The same voltage, for example, a voltage of 6V may be applied to the first electrode 252L and the second electrode 252R such that both the first contact angle $\theta_L$ and the second contact angle $\theta_R$ are inclined at an angle of approximately 90 degrees.

Figure 5:
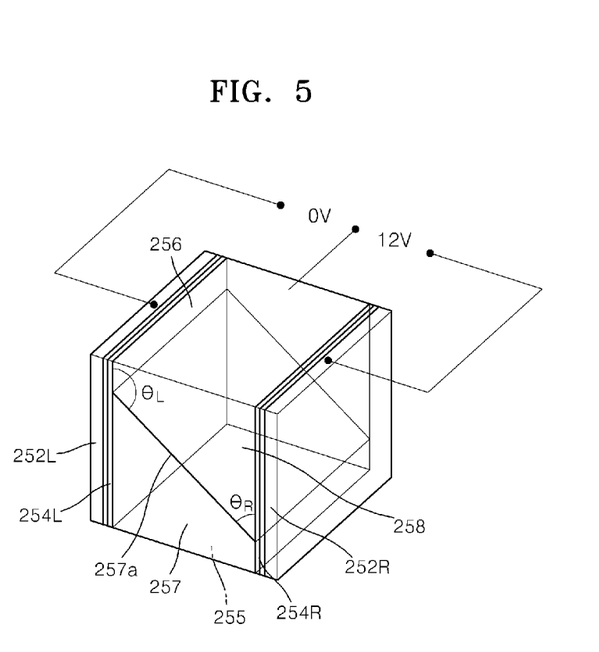
FIG. 5 is a diagram illustrating an example of an electro-wetting prism in a second state.

FIG. 5 illustrates an example of an electro-wetting prism in a second state. When the electro-wetting prisms 250R, 250G and 250B are in the second state, the interface 257a between the first medium 257 and the second medium 258 is inclined at a predetermined angle with respect to the light incidence plane 255. Different voltages, for example, voltages of 0V and 12V may be applied to the first electrode 252L and the second electrode 252R such that the first contact angle $\theta_L$ and the second contact angle $\theta_R$ are inclined at different angles.

For example, the first contact angle $\theta_L$ and the second contact angle $\theta_R$ may satisfy a relation of a supplementary angle. As the interface 257a is inclined, as illustrated in FIG. 3, incident light L that is approximately perpendicular to the light incidence plane 255 is refracted by an angle of $\delta$ in the interface 257a with respect to an initial direction. For example, the angle $\delta$ may vary according to the voltage applied to the first electrode 252L and the second electrode 252R.

Figure 6:
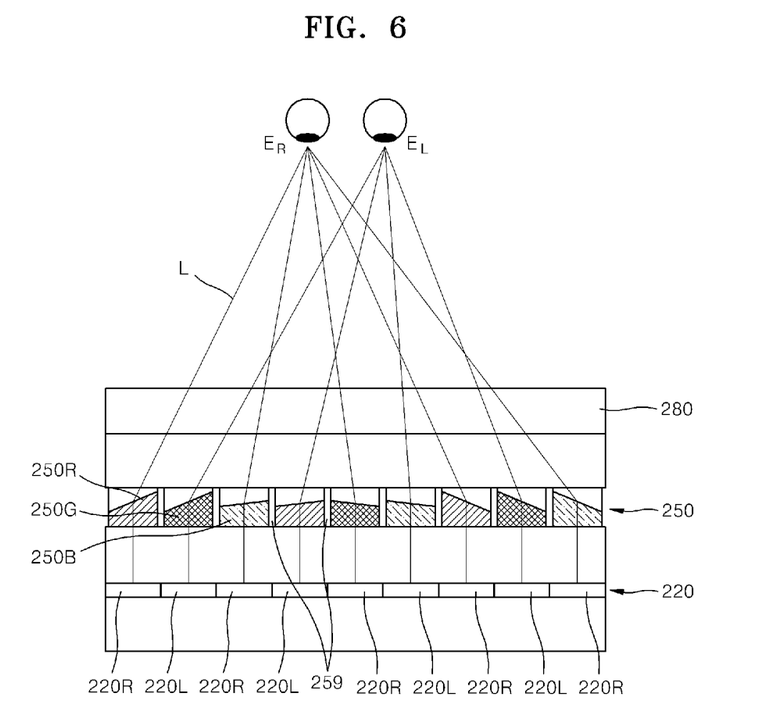
FIG. 6 is a diagram illustrating an example of a 2D/3D switchable image display device in 3D mode.

FIG. 6 illustrates an example of a 2D/3D switchable image display device in 3D mode.

Referring to FIGS. 1 and 6, the electro-wetting prism array 250 may change the path of a light beam L modulated in the liquid crystal cells 220a of the liquid crystal layer 220 and may direct the light beam L into at least two different view zones. For example, the control unit 300 may control a refraction angle by applying a voltage to each of the electro-wetting prisms 250R, 250G, and 250B such that the path of the light beam L modulated in the liquid crystal cells of the liquid crystal layer 220 are directed and focused for each view zone.

For example, the liquid crystal cells 220L corresponding to the light beam L may be directed toward a left eye $E_L$ to display an image for a left eye, and the liquid crystal cells 220R corresponding to the light beam L may be directed toward a right eye $E_R$ to display an image for a right eye. Accordingly, both the image for the left eye and the image for the right eye may be directed by the electro-wetting prism array 250 and may have a binocular disparity. As a result, a user can experience a stereoscopic effect. Meanwhile, the passing light beam L obtains a red, green, and/or blue color for each pixel, respectively, while passing through the electro-wetting prism array 250. That is, a complete range of color may be obtained by combining the individual pixels of red, green, and blue colors. The individual pixels may be combined by combining the adjacent pixels formed on the display panel 200 or by forming images by the individual pixels of red, green, and blue colors and overlapping the images on a user's image plane.

FIG. 6 illustrates an example in which light beams L are modulated in the liquid crystal layer 220 and are directed into two view zones, however it should be appreciated that the image display device is not limited thereto. For example, the electro-wetting prism array 250 may direct the light beams L modulated in the liquid crystal layer 220 to three or more view zones such that a plurality of users may observe the light beam L or such that one user may observe the light beam L while changing the position.

In addition, FIG. 6 illustrates an example in which images having different parallaxes are displayed at the same time, however it should be appreciated that the image display device is not limited thereto. For example, the liquid crystal layer 220 may sequentially display images that have different parallaxes, and may display a 3D image using a time multiplexing method used to control the electro-wetting prism array 250 to transmit a light beam to a view zone corresponding to a parallax of each image. The time multiplexing method displays an image corresponding to one view zone using all the pixels of the liquid crystal layer 220, and thus resolution reduction in the 3D mode can be compensated for.

In some embodiments, when the variable diffuser unit 280 is employed, the control unit 300 may control the variable diffuser unit 280 to operate in a transparent mode such that the passing light beam L is not scattered, thereby maintaining division of the view zone.

In some embodiments, when the 2D/3D switchable image display device includes a sensor (not shown) for tracing a user's position, the electro-wetting prism array 250 may be controlled to direct a view zone optimized for the user's position or to change division of the view zone according to the change of the user's position.

Because a path of a light beam L is adjusted by the electro-wetting prisms 250R, 250G and 250B so as to direct a view zone in the 2D/3D switchable image display device, loss of light during the division of the view zone does not occur. As a result, brightness in a 3D mode is greater than that of a conventional barrier-type stereoscopic image display device.

Figure 7:
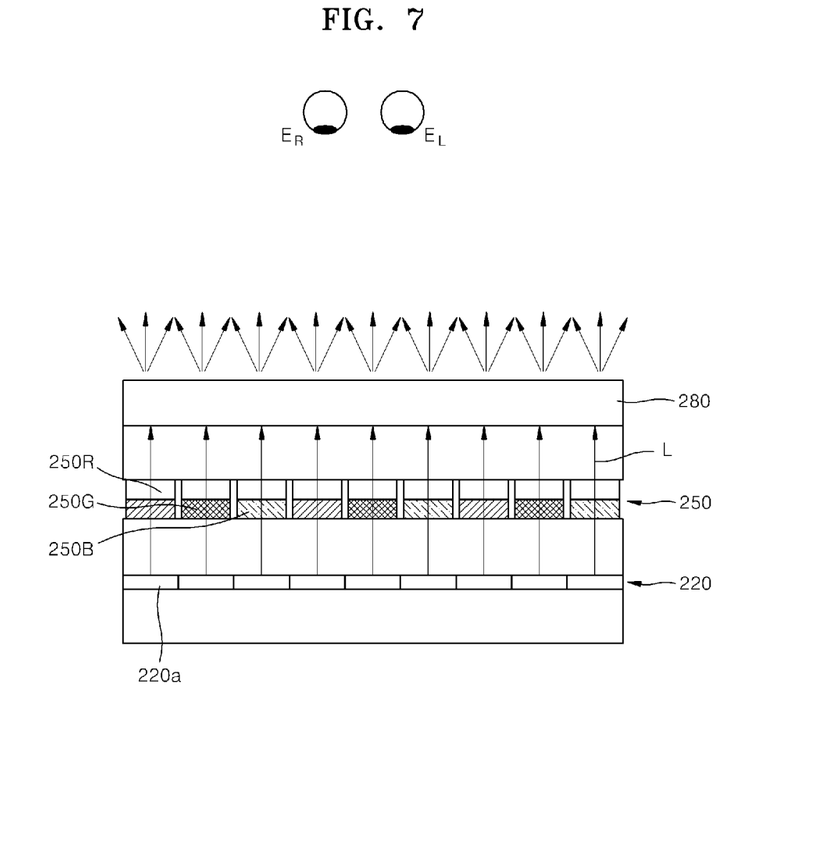
FIG. 7 is a diagram illustrating an example of a 2D/3D switchable image display device in 2D mode.

FIG. 7 illustrates an example of the 2D/3D switchable image display device in a 2D mode.

Referring to FIGS. 1 and 7, the electro-wetting prism array 250 may not divide a path of the light beam L modulated in the liquid crystal cells 220a of the liquid crystal layer 220 into different view zones. For example, as in the example described with reference to FIG. 4, the control unit 300 may apply a voltage such that the interface 257a between the first medium 257 and the second medium 258 of each of the electro-wetting prisms 250R, 250G and 250B are parallel to the light incidence plane 255. Meanwhile, the liquid crystal layer 220 may display gradation of an image with respect to a conventional 2D image. Thus, a user's left eye $E_L$ and right eye ER see the same conventional 2D image.

Furthermore, when the variable diffuser unit 280 is employed, the control unit 300 may control the variable diffuser unit 280 to operate in a scattering mode such that the passing light beam L may be scattered to ensure a wide viewing angle. Accordingly, the wide viewing angle may be realized in a 2D mode, and the liquid crystal layer 220 may be realized in a twisted-nematic (TN) liquid crystal mode, which is less expensive, thereby reducing a manufacturing cost. Furthermore, the TN liquid crystal mode may suppress the decrease in an aperture ratio compared to a mobile patterned vertical alignment (mPVA) liquid crystal mode, and may also increase a response time.

As described herein, the display panel 200 is a flat panel in which a light modulation panel including the liquid crystal layer 220 and the electro-wetting prism array 250 are formed as one body, however, it should be appreciated that the image display device is not limited thereto. For example, the light modulation panel including the liquid crystal layer 220 and the electro-wetting prism array 250 may be formed separately and then coupled together.

The 2D/3D switchable image display device described herein has a wide viewing angle property having uniform light dispersion with respect to various viewing positions in a 2D mode, and may collect light in a specific angle and adjust the angle in a 3D mode. Also, the 2D/3D switchable image display device may allow a 2D/3D switchable device to be formed on a flat panel.

The methods, functions, processes, and the like, described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A two-dimensional/three-dimensional (2D/3D) switchable image display device comprising:
   a backlight unit configured to emit light;
   a light modulation panel configured to modulate the light emitted from the backlight unit based on image information and for forming image gradation;
   an electro-wetting prism array comprising a plurality of electro-wetting prisms that are arranged to correspond to a plurality of pixels of the image in a display panel, for providing color to light beams that penetrate the plurality of electro-wetting prisms, and for adjusting the direction of the light beams; and a control unit configured to control the backlight unit and the electro-wetting prism array such that the light beams of the plurality of pixels of the image are directed towards at least two different view zones in a 3D mode, and such that the light beams of the plurality of pixels of the image maintain the paths of the light beams in a 2D mode, wherein the electro-wetting prism array further comprises a barrier wall formed between each of the plurality of electro-wetting prisms, and the barrier wall is formed of a black material for blocking light.

2. The 2D/3D switchable image display device of claim 1, wherein the electro-wetting prism comprises:
a first medium having color;
a transparent second medium separate from the first medium;
a housing for housing the first medium and the second medium, and comprising a light incidence plane, a light output plane facing the light incidence plane, and a plurality of side walls formed between the light incidence plane and the light output plane; and
an electrode structure for adjusting an angle of an interface between the first medium and the second medium.

3. The 2D/3D switchable image display device of claim 2, wherein the electrode structure comprises:
first and second electrodes that are formed in first and second side walls, respectively, and which face each other; and
first and second insulating layers that cover the first and second electrodes, respectively, and which each have a hydrophobic surface.

4. The 2D/3D switchable image display device of claim 2, wherein the first medium is an oily solution containing colored dyes and the second medium is an aqueous solution.

5. The 2D/3D switchable image display device of claim 2, wherein the first medium is an aqueous solution containing colored pigments and the second medium is an oily solution.

6. The 2D/3D switchable image display device of claim 2, wherein the electro-wetting prism array comprises:
a red electro-wetting prism that has a red first medium;
a green electro-wetting prism that has a green first medium; and
a blue electro-wetting prism that has a blue first medium.

7. The 2D/3D switchable image display device of claim 1, wherein the control unit controls the electro-wetting prism array such that the interface between the first medium and the second medium is inclined to the light incidence plane in a 3D mode, and such that the interface between the first medium and the second medium is approximately parallel to the light incidence plane in a 2D mode.

8. The 2D/3D switchable image display device of claim 1, further comprising a variable diffuser unit that is switchable between a scattering mode for scattering passing light and a transparent mode for transmitting passing light without scattering,
wherein the control unit controls the variable diffuser unit to be in a transparent mode during a 3D mode and to be in a scattering mode during a 2D mode.

9. The 2D/3D switchable image display device of claim 8, wherein the variable diffuser unit is a polymer dispersed liquid crystal (PDLC) panel.

10. The 2D/3D switchable image display device of claim 1, wherein the light modulation panel is a liquid crystal panel.

11. The 2D/3D switchable image display device of claim 1, wherein the backlight unit is a collimating surface light source emitting collimated light in a first direction.

12. An electro-wetting prism array comprising:
a plurality of electro-wetting prisms arranged in a two-dimensional (2D) array and including a plurality of red, green, and blue electro-wetting prisms arranged to correspond to pixels in a display panel that receive image information and, for providing color to the image information that penetrates the plurality of electro-wetting prisms; and
a barrier wall located between each electro-wetting prism,
wherein the electro wetting prism array switches between a 2D mode in which image information passes through the electro-wetting prism array such that when viewed by a user both a left and a right eye of a user see the same image, and a 3D mode in which image information is directed by the electro-wetting prism array to at least two different view zones such that when viewed by the user the left eye sees a first image and the right eye sees a second image that has a different parallax than the first image by a control unit that controls the electro-wetting prism array and a backlight unit,
wherein the barrier wall functions as a black matrix that reduces the generation of a black band effect and also prevents crosstalk between the image information received by each of the plurality of electro-wetting prisms.

13. The electro-wetting prism array of claim 12, wherein the image information is directed by the electro-wetting prism array in at least two different view zones such that when viewed by the user the left eye and the right eye of the user experience a binocular disparity.

14. The electro-wetting prism array of claim 12, wherein the image information is directed by the electro-wetting prism array in at least two different view zones such that when viewed by the user the left eye and the right eye of the user experience a stereoscopic effect.

15. The electro-wetting prism array of claim 12, wherein in 3D mode the first image and the second image are displayed at the same time.

16. The electro-wetting prism array of claim 12, wherein in 3D mode the first image and the second image are displayed sequentially.

17. The electro-wetting prism array of claim 12, wherein the electro-wetting prism array is electrically connected to a sensor to sense a user's position and gather data that is used by the electro-wetting prism array to optimize a view zone of the user based on the user's sensed position.

* * * * *